UNITED STATES PATENT OFFICE.

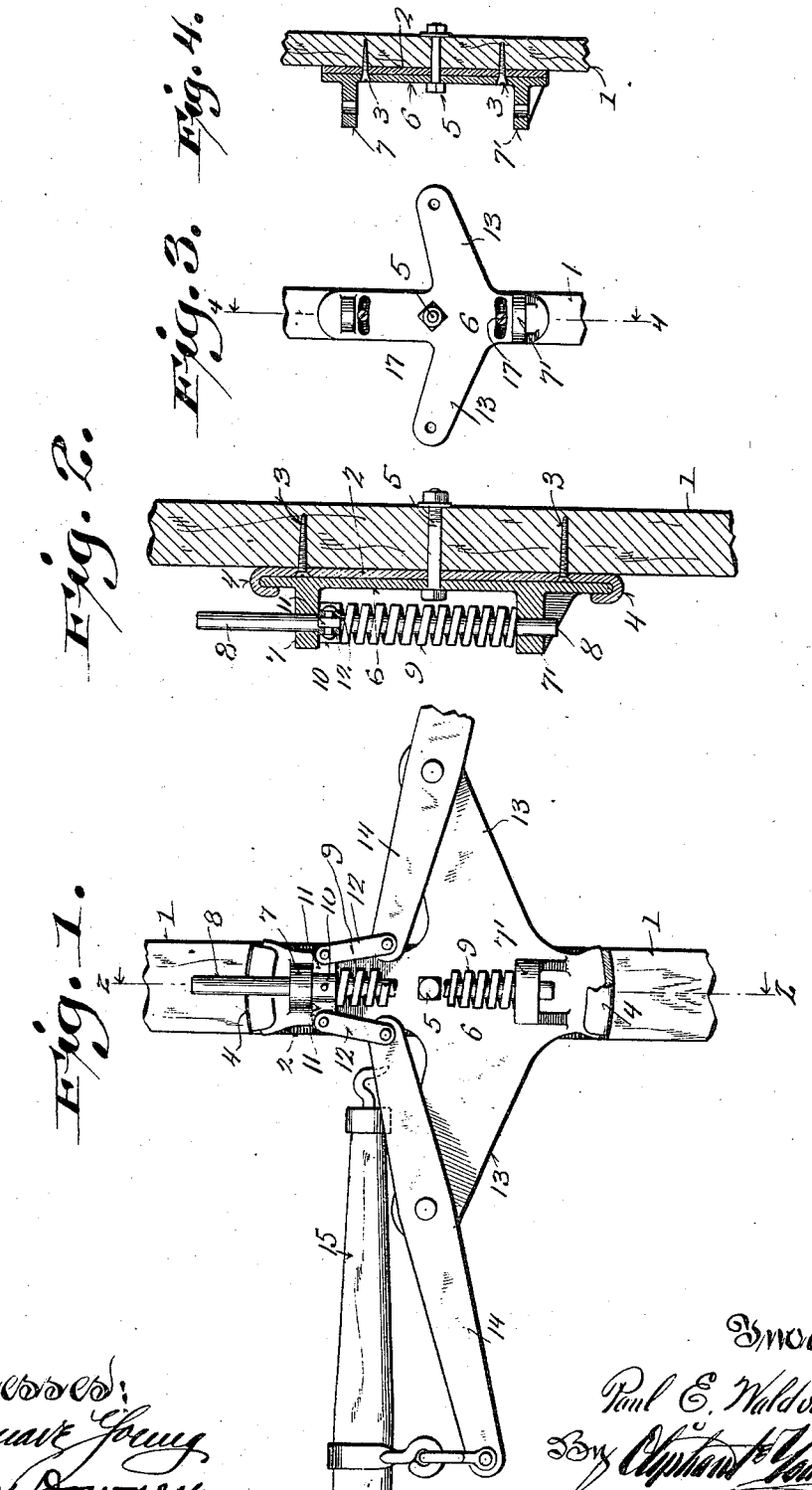

PAUL E. WALDVOGEL, OF MILWAUKEE, WISCONSIN.

DRAFT APPLIANCE.

1,011,289. Specification of Letters Patent. Patented Dec. 12, 1911.

Application filed August 2, 1911. Serial No. 642,035.

*To all whom it may concern:*

Be it known that I, PAUL E. WALDVOGEL, a citizen of the United States, and resident of Milwaukee, in the county of Milwaukee and State of Wisconsin, have invented certain new and useful Improvements in Draft Appliances; and I do hereby declare that the following is a full, clear, and exact description thereof.

My invention refers to spring-controlled draft appliances for teams, its object being to provide a simple, economical and effective yielding connection between the load and draft animals, whereby dead strain upon said animals is relieved due to the cushion effect.

The particular arrangement and construction of my draft appliance is such that a pair of levers carrying swingle-trees are each fulcrumed to a swiveled draft bracket, which draft bracket carries a spring-opposed plunger-bolt that is in link connection with the inner ends of the levers, the draft bracket being in turn slidably mounted upon a rub-plate. By this construction it will be seen that the double-tree generally used is dispensed with and that the apparatus has an equalizer whereby the necessary draft power is distributed from one animal to the other.

With the above object in view my invention consists in what is herein shown, described and claimed.

In the drawings Figure 1 represents a plan view of a draft rigging embodying the features of my invention, with parts broken away and parts in section to more clearly illustrate structural features; Fig. 2, a longitudinal sectional view the section being indicated by line 2—2 of Fig. 1; Fig. 3, a detail plan view of a modified form of draft bracket and rub-plate, and Fig. 4, a detail cross-section of the same.

Referring by characters to the drawings, 1 represents a pole or draft member and 2 a centrally apertured rub-plate, which rub-plate is secured to the pole by countersunk screws 3, said rub-plate being provided with inwardly extending end lips 4. The central aperture of the rub-plate is alined with the pole aperture which aperture is provided for the reception of a draft bolt 5, the same being usually employed for effecting swivel attachment of a double-tree, which double-tree with my improved device is dispensed with. A draft bracket 6 is fitted upon and in swivel connection with the rub-plate 2, the swivel connection being formed by the draft bolt 5 which passes through a central aperture in said draft bracket. The ends of the draft bracket are fitted under the rub-plate lips 4 whereby said bracket is held against tipping when subjected to draft, the lips being adapted to permit a free swivel movement between the rub-plate and bracket incidental to draft being applied thereto. The draft bracket is provided with oppositely disposed apertured ears 7, 7', for the reception of a plunger-bolt 8, movement of which plunger-bolt is opposed in one direction by a coiled spring 9 that is interposed between the rear ear 7 and a collar 10 that is adjustably secured to said plunger-bolt, the spring being coiled about the same. Apertured ears 11 extend from the collar 10, to which ears links 12 are connected.

The draft bracket is provided with oppositely disposed transverse arms 13 to which are fulcrumed levers 14, and to the outer ends of said levers are connected the usual swingle-trees 15. These levers 11, in effect, each constitute a double-tree and their inner ends are connected to the links 12, whereby when draft power is applied to said levers the same is resisted by the coiled spring.

Figs. 3 and 4 illustrate another form of my invention wherein the draft bracket is provided with circular end slots 16, into which end slots are fitted the tapered heads of retaining screws 17, the latter serving to hold the rub-plate to the tongue. In this form of the invention the overhanging lips are dispensed with and the slot and screw-head connection may be substituted therefor. It is apparent that in either form of the invention as disclosed that the ordinary double-tree draft bolt may be utilized for attaching the same to a pole and that the draft rigging may be readily detached from one vehicle and connected to the pole of another.

I claim:—

1. A draft rigging comprising a draft member, a rub-plate secured thereto, a draft bracket pivotally mounted upon the rub-plate, means carried by the rub-plate for engagement with the draft bracket ends, arms extending from said draft bracket, levers fulcrumed to the arms, whiffletrees mounted upon the outer ends of said levers, apertured ears extending from the aforesaid draft bracket, a plunger-bolt reciprocatively mounted within the apertures of the ears, a collar secured to the plunger-bolt, links connecting the collar and inner ends of the aforesaid levers, and a coiled spring interposed between the collar and one of the draft bracket ears.

2. A draft rigging comprising a pole, a rub-plate secured to the pole, a draft bracket mounted upon the rub-plate, engaging means carried by the rub-plate in connection with the ends of said draft bracket, a swivel-bolt for clamping the draft bracket, rub-plate and pole together, apertured ears extending upwardly from the aforesaid draft bracket, a plunger-bolt slidably mounted within the ear apertures, a collar secured to the plunger-bolt, a coiled spring interposed between the collar and one of the draft bracket ears, arms extending from the aforesaid draft bracket, levers fulcrumed to the arms, swingle-trees carried at the outer ends of the levers, ears extending from the plunger-bolt collar, and links connecting said ears and inner ends of the levers.

In testimony that I claim the foregoing I have hereunto set my hand at Milwaukee in the county of Milwaukee and State of Wisconsin in the presence of two witnesses.

PAUL E. WALDVOGEL.

Witnesses:
  MAY DOWNEY,
  GEO. W. YOUNG.

---

Copies of this patent may be obtained for five cents each, by addressing the "Commissioner of Patents, Washington, D. C."